(12) United States Patent
Labrecque et al.

(10) Patent No.: US 9,957,889 B2
(45) Date of Patent: May 1, 2018

(54) LOW NOISE AEROENGINE INLET SYSTEM

(71) Applicant: PRATT & WHITNEY CANADA CORP., Longueuil (CA)

(72) Inventors: Michel Labrecque, St-Bruno (CA); Vincent Couture-Gagnon, Boucherville (CA); Richard Ullyott, St-Bruno (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 785 days.

(21) Appl. No.: 14/463,031

(22) Filed: Aug. 19, 2014

(65) Prior Publication Data
US 2016/0053684 A1  Feb. 25, 2016

(51) Int. Cl.
*F02C 7/045* (2006.01)
*F02C 7/042* (2006.01)
*F02K 3/06* (2006.01)

(52) U.S. Cl.
CPC .............. *F02C 7/045* (2013.01); *F02C 7/042* (2013.01); *F02K 3/06* (2013.01); *F05D 2220/323* (2013.01); *F05D 2260/96* (2013.01)

(58) Field of Classification Search
CPC ........... F02C 7/042; F02C 7/045; F02K 1/827
See application file for complete search history.

(56) References Cited

U.S. PATENT DOCUMENTS

| 2,752,111 | A | 6/1956 | Schairer |
| 3,421,296 | A | 1/1969 | Beurer |
| 3,532,129 | A | 10/1970 | Ward et al. |
| 3,533,486 | A | 10/1970 | Paulson |
| 3,575,259 | A | 4/1971 | Wilkinson |
| 3,611,724 | A | 10/1971 | Kutney |
| 3,618,700 | A | 11/1971 | Bond |
| 3,623,494 | A | 11/1971 | Poucher |
| 3,666,043 | A | 5/1972 | Eschenburg |
| 3,736,750 | A | 6/1973 | Britt |
| 3,820,626 | A * | 6/1974 | Bonneaud ................. F02K 1/34 181/219 |
| 3,915,413 | A | 10/1975 | Sargisson |
| 3,998,048 | A | 12/1976 | Derue |
| 4,047,911 | A | 9/1977 | Krojer |

(Continued)

FOREIGN PATENT DOCUMENTS

| EP | 2199204 A2 | 6/2010 |
| GB | 761235 A | 11/1956 |

(Continued)

OTHER PUBLICATIONS

Extended European Search Report dated Jan. 14, 2016 issued on Applicant's corresponding European Patent Application No. 15181537.0-1607.

(Continued)

*Primary Examiner* — Justin Seabe
(74) *Attorney, Agent, or Firm* — Norton Rose Fulbright Canada

(57) ABSTRACT

An aeroengine is provided with a splitter apparatus disposed in a section of an inlet duct. The splitter apparatus can be actuated from a stowed position to a deployed position to allow splitter(s) to selectively move from out of the inlet flow to a position extending into the inlet duct to divide the inlet flow into multiple passages.

12 Claims, 4 Drawing Sheets

(56) References Cited

U.S. PATENT DOCUMENTS

| | | |
|---|---|---|
| 4,075,833 A | 2/1978 | Sargisson |
| 4,155,221 A | 5/1979 | Dhoore et al. |
| 4,192,336 A * | 3/1980 | Farquhar ............... F02C 7/045 137/15.1 |
| 4,250,703 A | 2/1981 | Norris et al. |
| 4,346,860 A | 8/1982 | Tedstone |
| 4,463,772 A | 8/1984 | Ball |
| 4,534,167 A | 8/1985 | Chee |
| 4,881,367 A | 11/1989 | Flatman |
| 5,000,399 A | 3/1991 | Readnour |
| 5,315,820 A | 5/1994 | Arnold |
| 5,702,231 A | 12/1997 | Dougherty |
| 5,782,082 A | 7/1998 | Hogeboom et al. |
| 6,089,505 A | 7/2000 | Gruensfelder et al. |
| 6,609,592 B2 | 8/2003 | Wilson |
| 6,896,099 B2 | 5/2005 | Porte |
| 7,048,229 B2 | 5/2006 | Sanders et al. |
| 7,429,018 B1 | 9/2008 | Kechely |
| 7,588,212 B2 | 9/2009 | Moe |
| 7,857,257 B2 | 12/2010 | Schwarz |
| 7,938,224 B2 | 5/2011 | Frustie et al. |
| 8,276,707 B2 | 10/2012 | Raimbault et al. |
| 8,286,654 B2 | 10/2012 | Prasad et al. |
| 8,529,188 B2 * | 9/2013 | Winter ............... B64D 33/02 244/53 B |
| 8,579,076 B2 | 11/2013 | Ayle et al. |
| 2011/0000548 A1 | 1/2011 | Sanders et al. |
| 2012/0325325 A1 | 12/2012 | Quackenbush et al. |

FOREIGN PATENT DOCUMENTS

| | | |
|---|---|---|
| GB | 2266340 A | 10/1993 |
| IR | 2906569 Al | 4/2008 |
| WO | 0236951 | 5/2002 |

OTHER PUBLICATIONS

Extended European Search Report dated Jan. 14, 2016 issued on Applicant's corresponding European Patent Application No. 15181596.6-1607.

Extended European Search Report dated Jan. 14, 2016 issued on Applicant's corresponding European Patent Application No. 15181618.8-1607.

Extended European Search Report dated Jan. 14, 2016 issued on Applicant's corresponding European Patent Application No. 15181594.1-1607.

* cited by examiner

LOW NOISE AEROENGINE INLET SYSTEM

TECHNICAL FIELD

The described subject matter relates generally to gas turbine engines, and more particularly to controlling noise in aircraft.

BACKGROUND OF THE ART

Future turboprop aircraft will be larger, heavier and with more powerful engines. Traditionally the aircraft engine industry has pointed to the propellers as the dominant noise source, but with modern electronic propeller control strategies, propeller contribution to the total noise of the engine is reduced and compressor noise propagating from the engine intake can become the dominant source of noise. This is particularly true during the approach phase of flight just before landing. At approach conditions the performance of the engine inlet is less important than in other flight phases since the engine operates at lower power and the conditions are not maintained for long enough to be significant for block fuel burn. Consequently, the industry has made a great effort to improve inlet noise attenuation capabilities, particularly under flight approach conditions.

Accordingly, there is a need to provide an improved engine inlet system for aircraft gas turbine engines.

SUMMARY

In one aspect, there is provided an aeroengine having a compressor inlet system, comprising an inlet duct for directing an air flow to a compressor, and an inlet splitter moveable between a stowed position in which the splitter is disposed substantially out the air flow so that the inlet duct provides substantially only one passage to the compressor, and a deployed position in which the splitter is disposed in the inlet duct to divide the inlet duct into at least two passages to the compressor, and wherein at least one surface of the splitter exposed to the air flow includes an acoustic treatment configured to reduce aeroengine noise.

In another aspect, there is provided an aeroengine having an inlet system, the inlet system comprising an inlet duct for directing an air flow from an inlet opening to a compressor rotor, and an inlet splitter apparatus disposed within a section of the inlet duct and having at least one splitter plate pivotally mounted to a wall of the inlet duct about an axis substantially parallel to a direction of the air flow, the at least one splitter plate being pivotally moveable between a deployed position in which the at least one splitter plate extends from the wall of the inlet duct into the inlet duct to expose both sides of the plate to the air flow, and a stowed position in which one side of the at least one plate is positioned against the wall of the inlet duct and the other side of the at least one plate is substantially exposed to the air flow.

In a further aspect, there is provided an aeroengine having an inlet system, the inlet system comprising an inlet duct for directing an air flow from an inlet opening to a compressor rotor, the inlet duct having a section including opposed and substantially flat first and second peripheral walls, an inlet splitter apparatus disposed within said section of the inlet duct and including first and third splitter plates pivotally mounted to the first peripheral wall about respective first and third axes substantially parallel to a direction of the air flow, and second and fourth splitter plates pivotally mounted to the second peripheral wall about respective second and fourth axes substantially parallel to the direction of the air flow, the splitter apparatus being operative between a stowed position in which the first and third splitter plates are pivoted to a position parallel to and adjacent the first peripheral wall and the second and fourth splitter plates are pivoted to a position parallel to and adjacent the second peripheral wall, and a deployed position in which the first and second splitter plates are pivoted to extend from the respective first and second peripheral walls into the inlet duct to in combination form a first partition wall extending through said section and the third and fourth splitter plates are pivoted to extend from the respective first and second peripheral walls into the inlet duct to in combination form a second partition wall extending through said section of the inlet duct.

Further details and other aspects of the described subject matter will be apparent from the detailed description and drawings included below.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
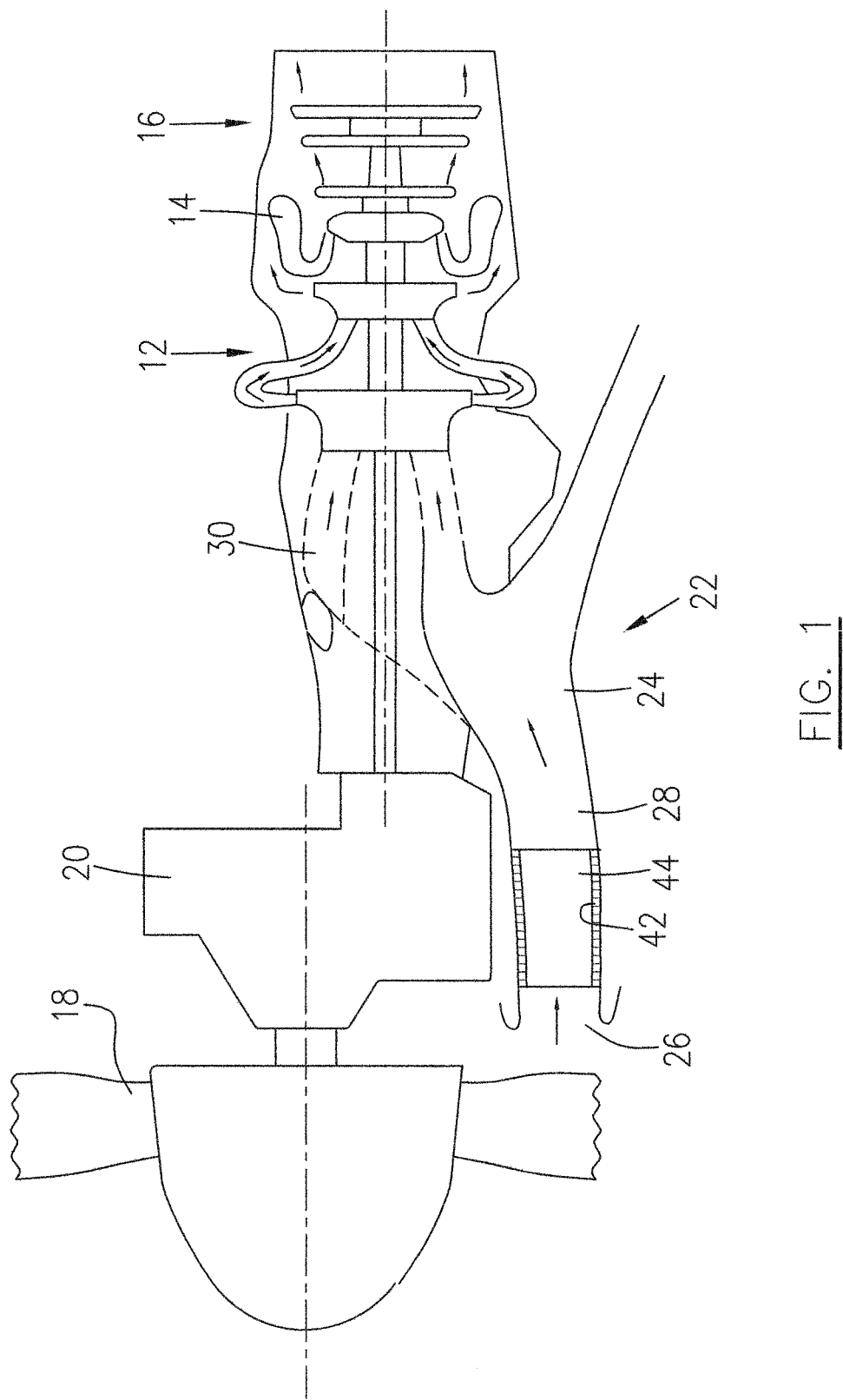
FIG. 1 is a schematic cross-sectional view of a turboprop aeroengine as an example illustrating application of the described subject matter.

FIG. 1 illustrates a turboprop aeroengine as an example of the application of the described subject matter, which generally includes in serial flow communication (indicated by arrows) a compressor section 12 for pressurizing air, a combustor 14 in which the pressurized air is mixed with fuel and ignited for generating an annular stream of hot combustion gases, and a turbine section 16 for extracting energy from the combustion gases to drive the compressor rotors in the compressor section 12 and further drive a propeller 18 through a reduction gear box 20.

It should be noted that the terms downstream and upstream are defined with respect to the direction of the air flow entering into and passing through the engine, indicated by arrows.

In this example, the turboprop aeroengine may provide an inlet system 22 having an inlet duct 24 for directing the airflow indicated by the arrows, from an inlet opening 26 to a first compressor rotor (not numbered) of the compressor section 12. The inlet duct 24 according to one embodiment, may have an upstream portion 28 (intake portion) and a downstream portion 30 (engine inlet portion) which is annular around the power shaft (not numbered) of the engine to direct the air flow in an annular stream toward the first compressor rotor of the compressor section 12.

Figure 2:
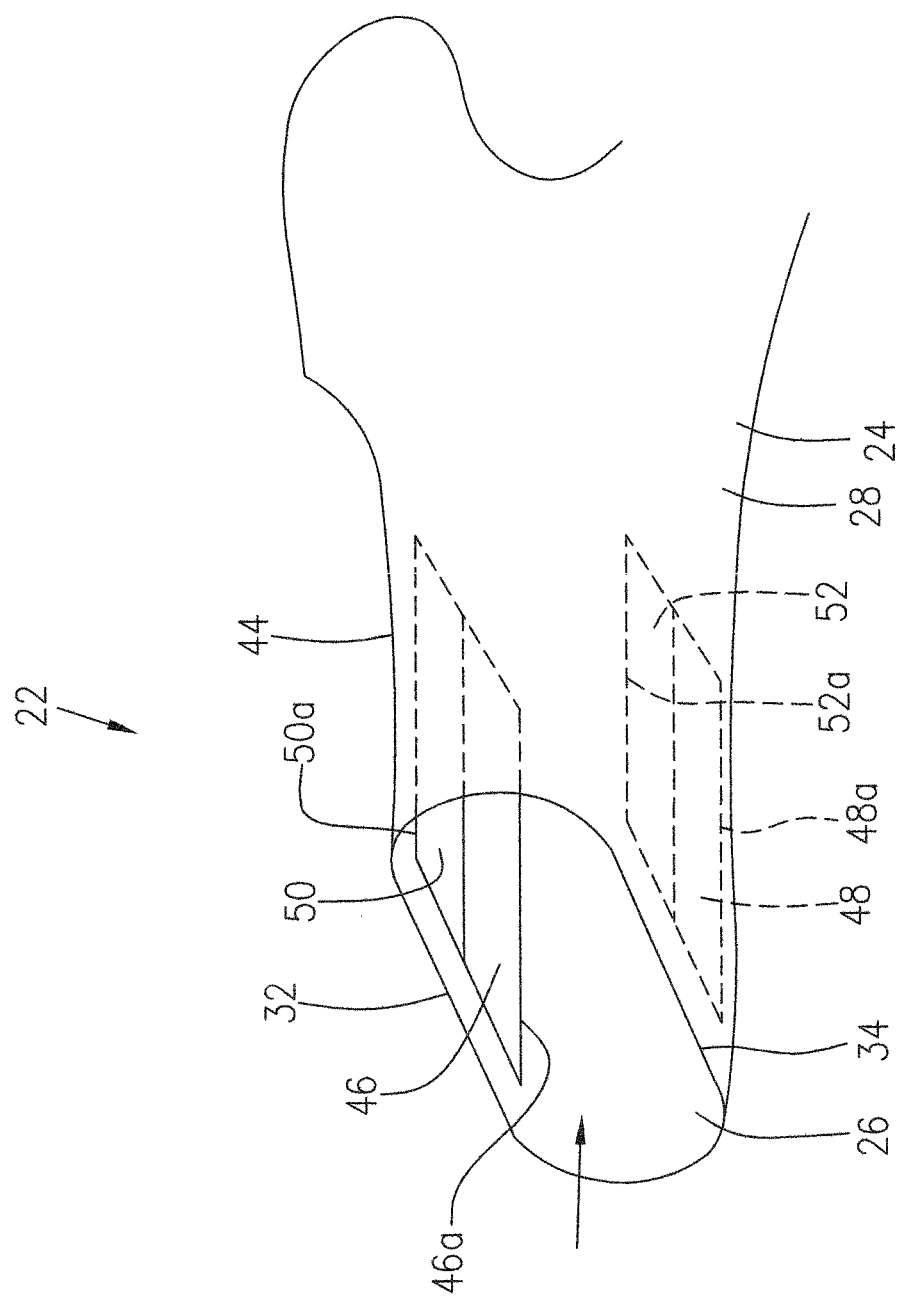
FIG. 2 is a schematic partial perspective view of the turboprop aeroengine of FIG. 1, illustrating an inlet system having splitter plates in a stowed position in an inlet duct.
Figure 3:
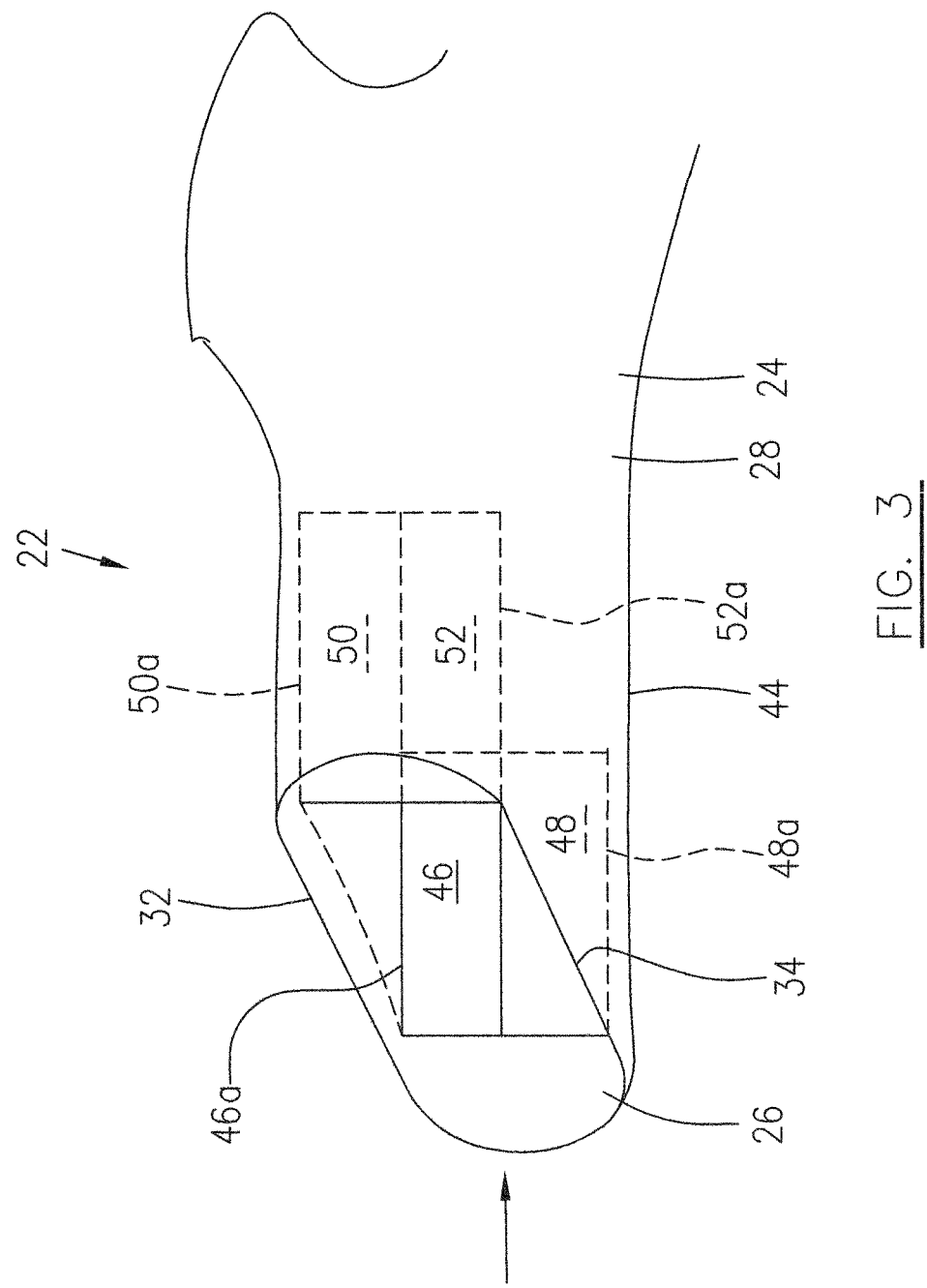
FIG. 3 is a schematic partial perspective view of the turboprop aeroengine of FIG. 1, illustrating the inlet system having splitter plates in a deployed position in an inlet duct.
Figure 4:
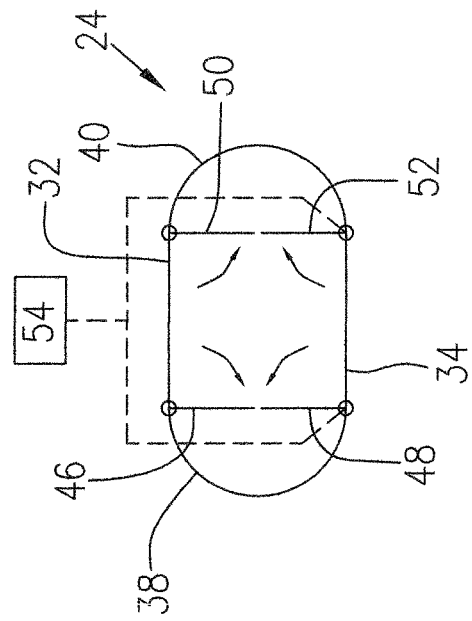
FIG. 4 is a schematic front elevational view of the inlet duct of FIG. 3 showing the splitter plates in the deployed position forming two partition walls which divide a single air passage defined within a section of the inlet duct, into three air passages extending through the section of the inlet duct.
Figure 5:
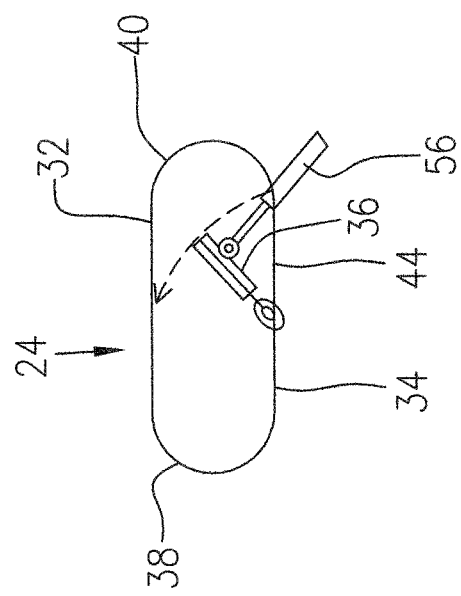
FIG. 5 is a schematic front elevational view of the inlet duct of FIG. 2 according to another embodiment.

Referring to FIGS. 1-6 and according to one embodiment, the upstream portion 28 of the inlet duct 24 may be defined with a peripheral wall (not numbered), having opposed and substantially parallel top and bottom walls 32, 34 with curved or rounded side walls 38, 40 (see FIGS. 4 and 5). Alternatively, side walls 38, 40 may be flat and the upstream portion 28 may define a rectangular cross-section. An inlet splitter apparatus (not numbered) may be provided in the inlet system 22 and may be disposed within a section 44 (see FIG. 1) of the upstream portion 28 of the inlet duct 24. The section 44 in FIG. 1 is disposed adjacent the inlet opening 26, but may be disposed in other locations within the upstream portion 28 of the inlet duct 24.

One or more acoustic treatment areas 42 may be provided on an inner surface of the inlet duct 24 which is in the section 44 as shown in FIG. 1, but may be located in other locations within the upstream portion 28 of the inlet duct 24.

The inlet splitter apparatus according to one embodiment may include four splitter plates (or may include at least one plate, as indicated in FIG. 5) 46, 48, 50 and 52 operatively mounted within the section 44 of the inlet duct 24. For example, the splitter plates 46 and 50 may be pivotally mounted to the top wall 32 about respective pivotal axes 46a and 50a which are substantially parallel to a direction of the air flow as indicated by the arrow, and the splitter plates 48 and 52 may be pivotally mounted to the bottom wall 34 about respective pivotal axes 48a and 52a which are substantially parallel to the direction of the airflow as indicated by the arrow. The splitter apparatus may be operative between a stowed position as shown in FIG. 2 and a deployed position as shown in FIG. 3. In the stowed position, the splitter plates 46 and 50 may be pivoted to a position parallel to and adjacent the top wall 32 and the splitter plates 48 and 52 may be pivoted to a position parallel to and adjacent the bottom wall 34. In the deployed position, the splitter plates 46 and 48 may be pivoted to extend from the respective top and bottom walls 32, 34 into the section 44 of the inlet duct 24 to in combination form a first partition wall (not numbered) extending through the section 44 of the inlet duct 24 and the splitter plates 50 and 52 may be pivoted to extend from the respective top and bottom walls 32, 34 into the section 44 of the inlet duct 24 to in combination form a second partition wall (not numbered) extending through the section 44 of the inlet duct 24.

As illustrated in FIG. 2, when the splitter plates are positioned parallel to and adjacent the respective top and bottom walls 32, 34 of the inlet duct 24 in the stowed position, section 44 of the inlet duct 24 is configured as substantially a single passage extending through the section 44 of the inlet duct 24 as shown in FIG. 3. When the splitter plates extend transversely into the inlet duct 24 in the deployed position, the single passage defined by section 44 of the inlet duct 24 is divided into three separate passages by the two partition walls extending through the section 44 of the inlet duct 24, as shown in FIG. 4.

It is understood that when the inlet splitter apparatus changes from the stowed position to the deployed position, the length/diameter ratio of the section 44 of the inlet duct 24 increases to thereby improve attenuation of the noise propagation from the compressor section 12 forwards to the inlet opening 26.

An actuation system 54 according to one embodiment may be provided to actuate the respective splitter plates 46, 48, 50, 52 in their pivotal motion between the stowed and deployed positions as shown in FIG. 4. The actuation system 54 may be electric, hydraulic or pneumatic using auxiliary power extracted from the engine or any other aircraft power source. A hydraulic cylinder 56 as an actuator is shown in FIG. 5. Like the reduced requirement for inlet performance during aircraft landing approach flight, such extraction of auxiliary power from the engine is not limiting power or is not sustained for a long enough duration to be a block fuel driver. The actuation system 54 moves the respective splitter plates 46, 48, 50, 52 in unison to effectively create two partition walls in the inlet duct when deployed.

In icing conditions the system may be periodically and partially cycled by the actuators to crack the ice.

Depending on inlet geometry, other configurations can be conceived with different numbers of splitters as required to optimize the balance between cost, weight and noise attenuation capabilities. For example, two splitter plates may be pivotally mounted to the respective top and bottom walls of the inlet duct to operatively form one partition wall in the deployed position.

Figure 6:
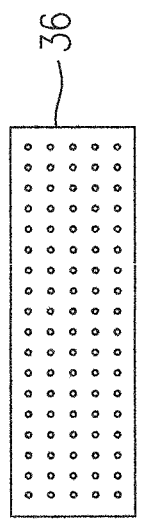
FIG. 6 is a schematic top plan view of a splitter plate having perforations or noise absorption material to form an acoustic treatment area thereon.

The number of the splitter plates may also be reduced to one in another embodiment as shown in FIG. 5. The only one splitter plate 36 may be pivotally mounted to the peripheral wall of the inlet duct, such as to either one of the top and bottom walls 32, 34 (an arrow in broken lines indicates the pivotal motion). When only one splitter plate 36 is provided, the splitter plate may be substantially rectangular as shown in FIG. 6 and may have a width (from the edge which is pivotally connected to one of the top and bottom walls to an opposite free edge) substantially equal to a distance measured from the top wall 32 to the bottom wall 34, thereby forming a partition wall to separate section 44 of the inlet duct 24, into two separate passages extending through the section 44.

As illustrated in FIGS. 2-3, it is understood that the pivotal axes 46a and 50a are spaced apart by a distance to allow free pivotal motion of the respective splitter plates 46 and 50 and the pivotal axes 48a and 52a are spaced apart by, for example the same distance to allow free pivotal motion of the respective splitter plates 48 and 52. The splitter plates according to one embodiment may have identical shapes such as rectangular. A length dimension of the splitter plates may be determined by the length of the section 44 of the inlet duct 24 to be equipped with the inlet splitter apparatus. The width dimension of the splitter plates may be determined by the cross-sectional dimension of the section 44 of the inlet duct 24 such that the partition walls formed by the splitter plates in the deployed position, can be formed without significant gaps between adjacent splitter plates.

The acoustic treatment area 42 defined on the inner surface of the inlet duct 24 may absorb acoustic energy when exposed to noise propagation through the inlet duct 24. In order to improve the absorption of acoustic energy, the total area of acoustic treatment surfaces within the inlet duct 24 may increase when the splitter apparatus is deployed in the inlet duct 24. For example, the splitter plates 46, 48, 50 and 52 may define an acoustic treatment area at one or both sides thereof by having acoustic treatment material applied thereto or by having perforations extending through one side to the other side thereof, as shown in FIG. 6. In the deployed position, the additional acoustic treatment areas defined on the one or both sides of the respective splitter plates are exposed to noise propagation through the inlet duct 24, thereby improving noise attenuation. Furthermore, additional acoustic treatment may also be provided by the treatment area 42 in the inlet duct 24 which is covered by splitter plates in the stowed position but is exposed when the splitter plates are in the deployed position.

The additional acoustic treatment areas defined on one or both sides of the splitter plates in the deployed position, may be tuned to attenuate a first dominant noise frequency which is different from a second dominant noise frequency. The acoustic treatment area 42 affixed on the inner surface of the peripheral wall of the inlet duct 24 may be tuned to substantially attenuate the second dominant noise frequency.

The above description is meant to be exemplary only, and one skilled in the art will recognize that changes may be made to the embodiments described without departing from the scope of the described subject matter. For example, the described subject matter may be applicable to any suitable engine, such as aeroengines configured differently from the turboprop aeroengine as illustrated in the drawings. For example, it may be suitable to provide in a turboshaft (helicopter), turbofan, or other gas turbine or other type of aeroengine. Still other modifications which fall within the scope of the described subject matter will be apparent to those skilled in the art, in light of a review of this disclosure, and such modifications are intended to fall within the appended claims.

The invention claimed is:

1. An aeroengine comprising an inlet duct for directing an air flow from an inlet opening to a compressor rotor, and an inlet splitter apparatus disposed within a section of the inlet duct and having at least one splitter plate pivotally mounted to a wall of the inlet duct about an axis substantially parallel to a direction of the air flow, the at least one splitter plate being pivotally moveable between a deployed position in which the at least one splitter plate extends from the wall of the inlet duct into the inlet duct to expose both sides of the plate to the air flow, and a stowed position in which one side of the at least one plate is positioned against the wall of the inlet duct and the other side of the at least one plate is substantially exposed to the air flow, the at least one splitter plate extends from said one of the top and bottom walls across the inlet duct to the other one of the top and bottom walls, thereby forming a partition wall between the top and bottom walls in said section of the inlet duct when the splitter apparatus is in the deployed position.

2. The aeroengine as defined in claim 1, wherein the at least one splitter plate comprises perforations extending therethrough.

3. The aeroengine as defined in claim 1, wherein the at least one splitter plate comprises acoustic treatment material applied to at least one side of the at least splitter one plate.

4. The aeroengine as defined in claim 1, wherein said section of the inlet duct comprises a flat top wall and a flat bottom wall opposite one to the other, the at least one splitter plate being pivotally mounted to one of the flat top and bottom walls.

5. The aeroengine as defined in claim 4, wherein said section of the inlet duct is disposed adjacent the inlet opening.

6. The inlet system as defined in claim 1, wherein said one of the top and bottom walls includes at least one acoustic treatment area that is covered by the at least one splitter plate when the at least one splitter plate is in the stowed position and is exposed when the at least one splitter plate is in the deployed position.

7. An aeroengine inlet system, the inlet system comprising an inlet duct for directing an air flow from an inlet opening to a compressor rotor of an aeroengine, the inlet duct having a section including opposed and substantially flat first and second peripheral walls, an inlet splitter apparatus disposed within said section of the inlet duct and including first and third splitter plates pivotally mounted to the first peripheral wall about respective first and third axes substantially parallel to a direction of the air flow, and second and fourth splitter plates pivotally mounted to the second peripheral wall about respective second and fourth axes substantially parallel to the direction of the air flow, the splitter apparatus being operative between a stowed position in which the first and third splitter plates are pivoted to a position parallel to and adjacent the first peripheral wall and the second and fourth splitter plates are pivoted to a position parallel to and adjacent the second peripheral wall, and a deployed position in which the first and second splitter plates are pivoted to extend from the respective first and second peripheral walls into the inlet duct such that the first splitter plate extends to the second splitter plate to in combination form a first partition wall extending through said section between the first and second peripheral walls and the third and fourth splitter plates are pivoted to extend from the respective first and second peripheral walls into the inlet duct such that the third splitter plate extends to the fourth splitter plate to in combination form a second partition wall extending through said section of the inlet duct between the first and second peripheral walls.

8. The inlet system as defined in claim 7, wherein the first and third axes are spaced apart by a first distance to allow free pivotal motion of the respective first and third splitter plates, and wherein the second and fourth axes are spaced apart by a second distance to allow free pivotal motion of the respective second and fourth splitter plates.

9. The inlet system as defined in claim 8, wherein the first and second distances are substantially equal.

10. The inlet system as defined in claim 7, comprising an actuation apparatus for actuating the pivotal motion of the respective first, second, third and fourth splitter plates.

11. The inlet system as defined in claim 7, wherein the first, second, third and fourth splitter plates comprise acoustic treatment areas on both sides of the respective splitter plates.

12. The inlet system as defined in claim 7, wherein an inner surface of the respective first and second peripheral walls in said section of the inlet duct defines an acoustic treatment area on the respective first and second peripheral walls.

* * * * *